(12) United States Patent
Gostkowski

(10) Patent No.: US 10,100,607 B2
(45) Date of Patent: Oct. 16, 2018

(54) HIGH TEMPERATURE, BI-DIRECTIONAL SHEAR SEAL AND RELATED METHODS

(71) Applicant: BAKER HUGHES INCORPORATED, Houston, TX (US)

(72) Inventor: Kyle Gostkowski, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 270 days.

(21) Appl. No.: 14/886,785

(22) Filed: Oct. 19, 2015

(65) Prior Publication Data

US 2017/0107789 A1    Apr. 20, 2017

(51) Int. Cl.
| | |
|---|---|
| F16K 3/18 | (2006.01) |
| E21B 34/06 | (2006.01) |
| E21B 49/10 | (2006.01) |
| F16K 3/02 | (2006.01) |

(52) U.S. Cl.
CPC .............. *E21B 34/06* (2013.01); *E21B 49/10* (2013.01); *F16K 3/029* (2013.01); *F16K 3/18* (2013.01)

(58) Field of Classification Search
CPC .......... E21B 34/06; E21B 34/14; E21B 49/10; F16K 3/029; F16K 3/18; F16K 11/04; F16K 11/0655; F16K 11/0712; F16K 11/0716
USPC ........................................ 251/175, 189, 195
See application file for complete search history.

(56) References Cited

U.S. PATENT DOCUMENTS

| | | | | | |
|---|---|---|---|---|---|
| 2,560,841 | A | * | 7/1951 | Bishop ................ | F16K 11/0655 137/625.48 |
| 2,959,189 | A | * | 11/1960 | Natho ................... | F16K 11/074 137/625.43 |
| 3,018,796 | A | * | 1/1962 | Loup ..................... | F16K 11/074 137/625.12 |
| 3,329,168 | A | * | 7/1967 | Vollmer ................. | F15B 13/04 137/625.65 |
| 3,370,611 | A | * | 2/1968 | Flint ...................... | F15B 13/04 137/625.25 |
| 3,547,155 | A | * | 12/1970 | Ulbing .................... | B66D 1/44 137/625.21 |
| 3,584,648 | A | * | 6/1971 | Lubos ................... | F01B 3/0008 137/625.21 |
| 3,601,149 | A | * | 8/1971 | Gilmore ................. | F16K 17/04 137/484 |
| 3,626,981 | A | * | 12/1971 | Bauer-Nilsen ........ | F03C 1/0444 137/112 |

(Continued)

FOREIGN PATENT DOCUMENTS

| | | |
|---|---|---|
| EP | 28937844 | 2/2015 |
| WO | 2014158296 A1 | 10/2014 |

OTHER PUBLICATIONS

PCT/U2016/057622—International Search Report dated Jan. 25, 2017.

*Primary Examiner* — William McCalister
(74) *Attorney, Agent, or Firm* — Mossman, Kumar & Tyler, PC

(57) ABSTRACT

A valve includes an outer piston, an inner piston telescopically disposed in the outer piston. A cavity separates at least a portion of the inner piston and the outer piston. The valve also includes a seal disposed in the cavity and that forms an upper pressure chamber and a lower pressure chamber. A first flow space connects the lower pressure chamber with a first flow path and a second flow space connects the upper pressure chamber with a second flow path. A biasing member engages the inner and outer piston.

16 Claims, 3 Drawing Sheets

(56) References Cited

U.S. PATENT DOCUMENTS

| | | | | |
|---|---|---|---|---|
| 3,642,020 A * | 2/1972 | Payne | F15B 13/02 | 137/112 |
| 3,665,813 A * | 5/1972 | Loveless | F15B 15/261 | 92/30 |
| 3,683,966 A * | 8/1972 | Payne | F16K 11/0655 | 137/625.48 |
| 3,872,889 A * | 3/1975 | Smith | F16K 11/074 | 137/625.21 |
| 3,917,220 A * | 11/1975 | Gilmore | E21B 33/064 | 137/116.3 |
| 3,966,235 A * | 6/1976 | Lewis | E21B 33/038 | 166/363 |
| 4,112,973 A * | 9/1978 | Klie | F04B 1/0465 | 137/625.21 |
| 4,124,192 A * | 11/1978 | White | F16K 31/0648 | 251/129.15 |
| 4,151,855 A * | 5/1979 | Levin | F16K 5/0636 | 137/15.22 |
| 4,493,335 A * | 1/1985 | Watson | F16K 11/0655 | 137/116.3 |
| 4,554,940 A * | 11/1985 | Loup | F16K 11/0655 | 137/115.15 |
| 4,579,136 A | 4/1986 | Oman et al. | | |
| 4,856,557 A * | 8/1989 | Watson | F16K 3/0209 | 137/625.25 |
| 4,856,756 A * | 8/1989 | Combs | E21B 34/14 | 137/565.36 |
| 4,962,786 A * | 10/1990 | Gellerson | F16K 21/16 | 137/493.6 |
| 5,794,917 A * | 8/1998 | Sahm | F16K 3/18 | 137/625.11 |
| 5,881,998 A * | 3/1999 | Brenes | F15B 15/16 | 251/204 |
| 6,186,477 B1 * | 2/2001 | McCombs | A61M 16/20 | 128/205.24 |
| 6,520,478 B1 * | 2/2003 | Hope | F16K 11/0704 | 251/297 |
| 6,651,696 B2 * | 11/2003 | Hope | F16K 17/046 | 137/469 |
| 6,702,024 B2 * | 3/2004 | Neugebauer | E21B 49/081 | 166/169 |
| 6,983,922 B2 * | 1/2006 | Watson | F16K 31/041 | 137/625.46 |
| 7,000,890 B2 * | 2/2006 | Bell | E21B 33/0355 | 251/129.15 |
| 7,073,590 B2 * | 7/2006 | Neugebauer | E21B 49/081 | 166/169 |
| 7,757,703 B2 * | 7/2010 | Bell | G05D 16/10 | 137/116.3 |
| 2005/0067599 A1 * | 3/2005 | Chatufale | F16K 3/0227 | 251/171 |
| 2015/0129784 A1 | 5/2015 | Olsen et al. | | |

\* cited by examiner

HIGH TEMPERATURE, BI-DIRECTIONAL SHEAR SEAL AND RELATED METHODS

CROSS REFERENCE TO RELATED APPLICATIONS

None.

FIELD OF THE DISCLOSURE

This disclosure pertains generally to flow control devices such as valves.

BACKGROUND OF THE DISCLOSURE

During both drilling of a wellbore and after drilling, fluid (oil, gas and water) from the formation ("formation fluid") is often extracted to determine the nature of the hydrocarbons in hydrocarbon-bearing formations using a formation testing tool that contains one or more chambers or tanks for collecting fluid samples. The fluid samples are tested downhole during collection process and at the surface to determine various properties of the extracted formation fluid. During drilling of a well, a drilling fluid is circulated through a drill string and the annulus between the drill string and the wellbore diameter. The pressure of the drilling fluid on the formation is greater than the pressure of the formation in which the well is drilled. The drilling fluid invades into the formation surrounding the wellbore to varying depths, referred to as the invaded zone, which contaminates the original or connate fluid present in the invaded zone. To collect samples of the original fluid present in the formation, either during drilling or post drilling, a formation testing tool is conveyed into the wellbore. A probe having a fluid line is sealingly pressed against the wellbore wall. A pump typically extracts the fluid from the formation into the probe. The initially extracted fluid is discarded into the wellbore while testing it for contamination. When the extracted fluid is sufficiently clean, fluid samples are collected in one or more chambers (tanks) for analysis. Single and multiple probes have been utilized for extracting formation fluid.

The present disclosure addresses the need for sealing high differential pressure in a downhole environment, as well as in surface applications.

SUMMARY OF THE DISCLOSURE

In aspects, the present disclosure provides a valve that includes an outer piston; an inner piston telescopically disposed in the outer piston, wherein a cavity separates at least a portion of the inner piston and the outer piston; a seal disposed in the cavity and forming an upper pressure chamber and a lower pressure chamber; a first flow space connecting the lower pressure chamber with a first flow path; a second flow space connecting the upper pressure chamber with a second flow path; and a biasing member engaging the inner and outer piston.

In aspects, the present disclosure also provides an apparatus for connecting a first fluid flow path to a second fluid flow path. The apparatus may include an outer piston, an inner piston, a biasing member, a sealing member, a first flow space, and a second flow space. The outer piston may include a head having a sealing surface, an axial bore extending therethrough, a shaft section extending from the head, a step formed along the shaft section, and a diametrically reduced bore section formed adjacent the step. The inner piston may include a head having a sealing surface, a shaft section extending from the head, a shoulder formed along the shaft section, an a diametrically reduced distal end. The shaft section of the inner piston may be telescopically disposed in the axial bore of the outer piston. The biasing member engages the inner and outer pistons and pushes the inner and outer pistons apart by applying a biasing force to the inner piston and the outer piston. The seal member may be disposed in a cavity formed between the step of the outer piston shaft section and the shoulder of the inner piston shaft section. The seal may form an upper pressure chamber and a lower pressure chamber in the cavity. The first flow space hydraulically connects the lower pressure chamber to the first fluid flow path and includes at least a portion of the axial bore of the inner piston, and a space between the diametrically reduced distal end and the outer piston. The second flow space hydraulically connects the upper pressure chamber to a second fluid flow path and includes a space between the shaft section of the inner piston and the outer piston.

In aspects, the disclosure further provides a method for connecting a first fluid flow path to a second fluid flow path. The method may include forming the first and the second fluid flow path in an enclosure; disposing a first sealing element and a second sealing element in the enclosure; and disposing a valve in the enclosure. The valve may include an outer piston, an inner piston telescopically disposed in the outer piston, wherein a cavity separates at least a portion of the inner piston and the outer piston, a seal disposed in the cavity and forming an upper pressure chamber and a lower pressure chamber, a first flow space connecting the lower pressure chamber with a first flow path, a second flow space connecting the upper pressure chamber with a second flow path, and a biasing member engaging the inner and outer piston. The method further includes urging the upper piston against the first sealing element with the biasing member; and urging the lower piston against the second sealing element with the biasing member.

Thus, the present disclosure provides seals that enhance control, operation, service life, reliability, and/or performance for valves and other flow control devices. The teachings may be applied to a variety of systems both in the oil and gas industry and elsewhere.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
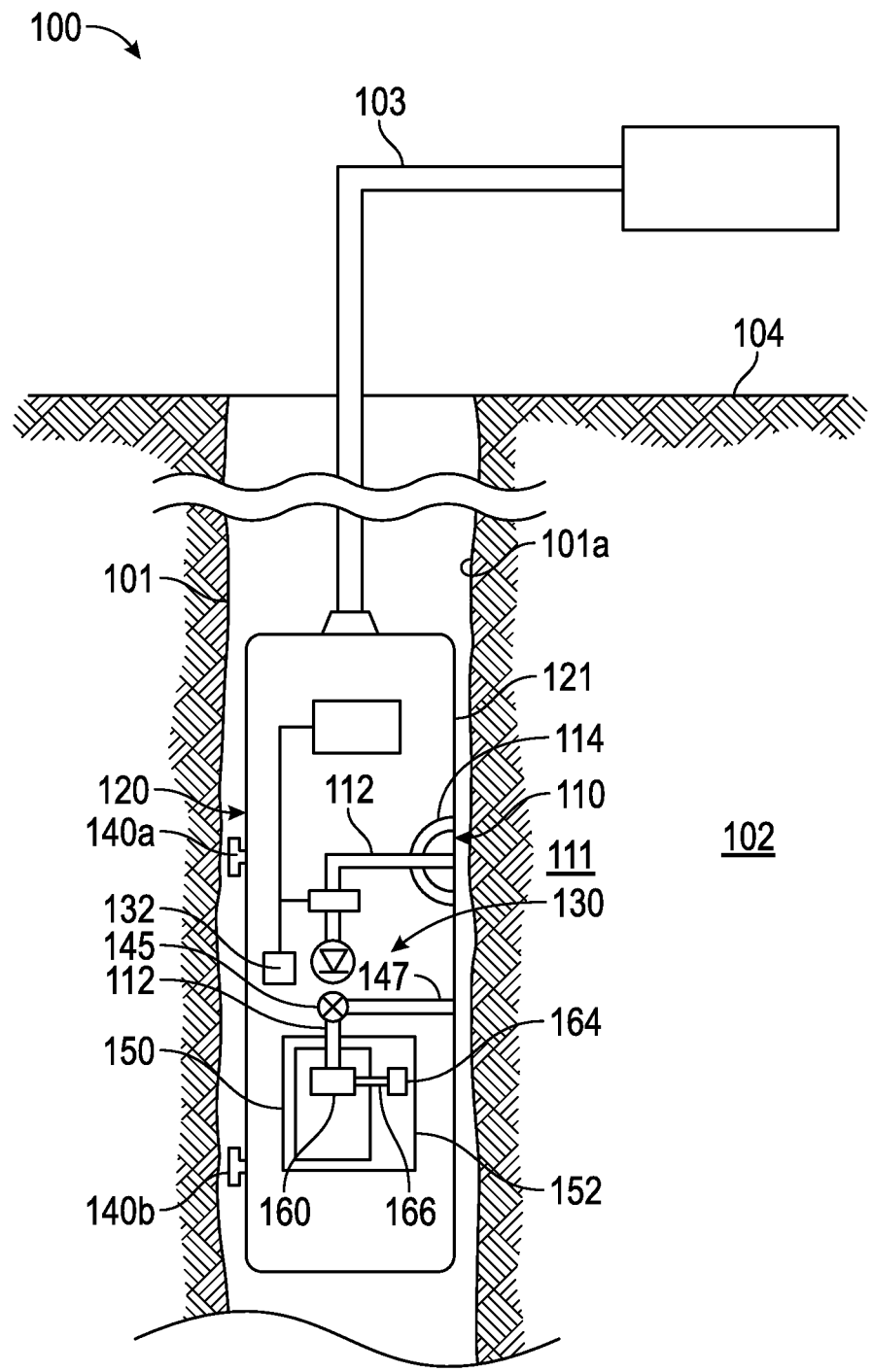
FIG. 1 is a schematic diagram of an exemplary formation testing system for obtaining formation fluid samples, according to one embodiment of the disclosure.

The present disclosure relates to valves suitable for high-temperature applications. High ambient temperatures are often found in wellbores drilled in subterranean formations. For brevity, the present teachings will be discussed in the context of tooling used in such wellbores. However, the present disclosure is susceptible to embodiments of different forms and which can be used in a variety of surface and subsurface applications. There are shown in the drawings, and herein will be described in detail, specific embodiments of the present disclosure with the understanding that the present disclosure is to be considered an exemplification of the principles described herein, and is not intended to limit the disclosure to that illustrated and described herein. Accordingly, the embodiments discussed below are merely illustrative and not exhaustive.

FIG. 1 is a schematic diagram of an exemplary formation evaluation system 100 for obtaining formation fluid samples from a subterranean formation 102 and retrieving such samples to the surface. The system 100 may include a downhole formation evaluation tool 120 conveyed through a wellbore 101 formed in a formation 102 by a conveying member 103, such as a wireline, coiled tubing or a drilling tubular, from a surface location 104. In one embodiment, the tool 120 includes a probe 110 that may include a fluid conduit or flow line 112 and a pad or packer 114 around the flow line 112. The probe 110 acts as a fluid extraction or fluid withdrawal device and may extend from a tool body 121 radially outward against the wellbore wall 101a. Pads 140a and 140b on the opposite side of the probe 110 are extended so that the probe 110, when extended, will urge and seal against the wellbore wall 101a.

A pump 130 is coupled to the fluid line 112 for withdrawing the formation fluid 111 into the flow line 112. The pump may be driven by a motor 132, such as a hydraulic motor. In one aspect, the flow line 112 from the pump is connected to an inlet of a sample chamber or tank 150, which is carried by or placed in chamber or tank carrier 152. In one non-limiting embodiment, a flow control device, such as valve 160, is connected to the flow line 112 and placed inside the chamber 150. In another aspect, the valve 160 may be operated by an electric motor 164 placed outside the chamber 150 via a shaft member 166. Another flow control device, such as a valve 145, is provided in the flow line 112 between the pump 130 and the valve 160 to enable the formation fluid 111 to flow to the chamber 150 via flow line 112 or to the wellbore via a flow line 147.

To obtain a sample of the clean formation fluid, tool 120 is conveyed and placed at a selected depth in the wellbore 101. Pads 140a and 140b are activated to contact the wellbore wall 101a. The probe 110 is activated to urge and seal against the wellbore wall 101a. Pump 130 is activated to draw the formation fluid 111 into flow line 112. The fluid initially drawn through the probe 110 is representative of the fluid present in the invaded zone and is thus contaminated. Once the fluid 111 is determined to be clean, the valve 160 is opened and valve 145 is closed. The fluid is then collected in sample chamber 150. Once the sample has been collected, valve 160 is closed. Thereafter, the tool 120 is retrieved to the surface and chamber 150 is detached from the carrier.

As discussed above, the tool 120 can use several valves to control the flow of fluids during operation. Aspects of the present disclosure are directed to shear valve arrangements that may be advantageously used in the tool 120 for flow control. Shear valves form a seal between two surfaces that slide against one another. Generally, valves according to the present disclosure can control large pressure differential flow in two directions reliably at high temperature (e.g., above 400 degrees F.). Conventionally, shear seal valves are designed to have a single inlet and outlet such that they seal off high pressure in a single direction. Such an arrangement can cause traditional shear seal valves to be unsuitable for applications where the pressure differential could arise in opposing directions. In such applications, pressure in the "wrong" direction may cause the shear seal to unseat. Non-limiting embodiments of the present disclosure utilize a biasing member and a single sealing member, e.g., an elastomeric O-ring, in an arrangement that is less susceptible to such undesirable behavior. In embodiments, prior to operation, the biasing member creates a desired sealing pre-load to form an initial seal at ambient downhole temperatures. During operation, the sealing load is generated in one of two opposing pressure chambers formed by the single sealing member.

Figure 2:
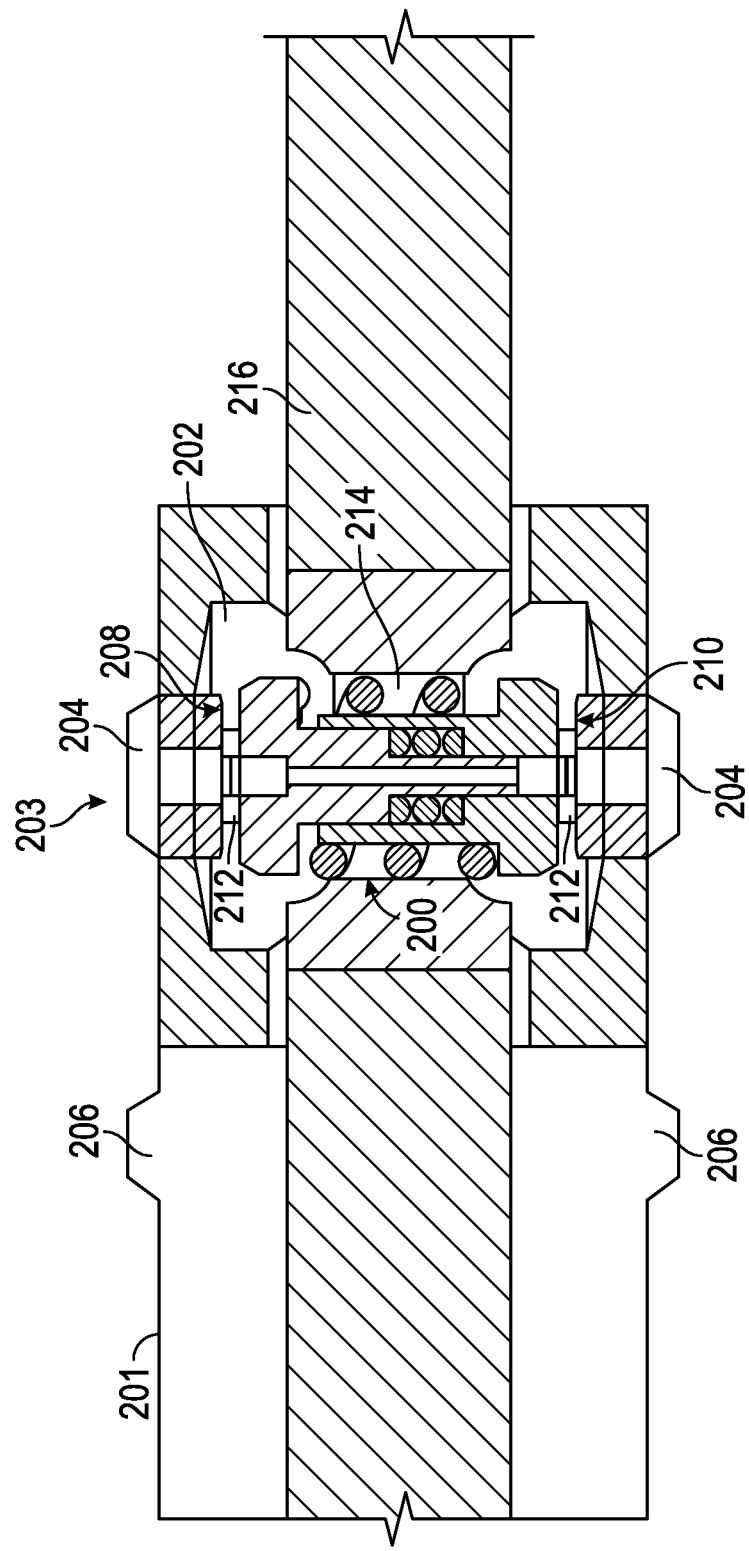
FIG. 2 is a line diagram of a non-limiting embodiment of a seal assembly for use in the system of FIG. 1.

FIG. 2 illustrates one non-limiting embodiment of a valve 200 according to the present disclosure. The valve 200 may be used within the system 100 described in FIG. 1 or any other fluid-conveying system. In one arrangement, the valve 200 may be positioned within a chamber 202 of a valve assembly 203. The valve assembly 203 may include two flow paths 204, 206 are in selective fluid communication with the chamber 202. The flow paths 204, 206 may be annular such that fluid is conveyed independently and radially inward into the chamber 202. For instance, the flow paths 204, 206 may directly or indirectly connect the probe 110 with the pump 130 or sample tank 150. The paths 204, 206 may be formed of passages, conduits, gaps, spaces, bores, tubes, fluid lines and other such features formed within an enclosure 201 in which the valve 200 is positioned or elsewhere in the system 100. The valve 200 selectively forms a fluid barrier at locations 208, 210 that can block fluid communication between the paths 204, 206. In one arrangement, these fluid barriers may be formed between the outer surfaces of the valve 200 and seal elements 212. In some embodiments, the seal elements 212 may be ceramic inserts or disks.

In one embodiment, the valve 200 may be disposed within a bore 214 of an axially translating shaft 216. Axially sliding the shaft 216 and the valve 200 causes the valve 200 to either engage or disengage from the seal elements 212. When engaged, the fluid barriers at the locations 208, 210 prevents fluid flow between the paths 204, 206 via the chamber 202. When disengaged, fluid can flow between the paths 204, 206 via the chamber 202.

Figure 3:
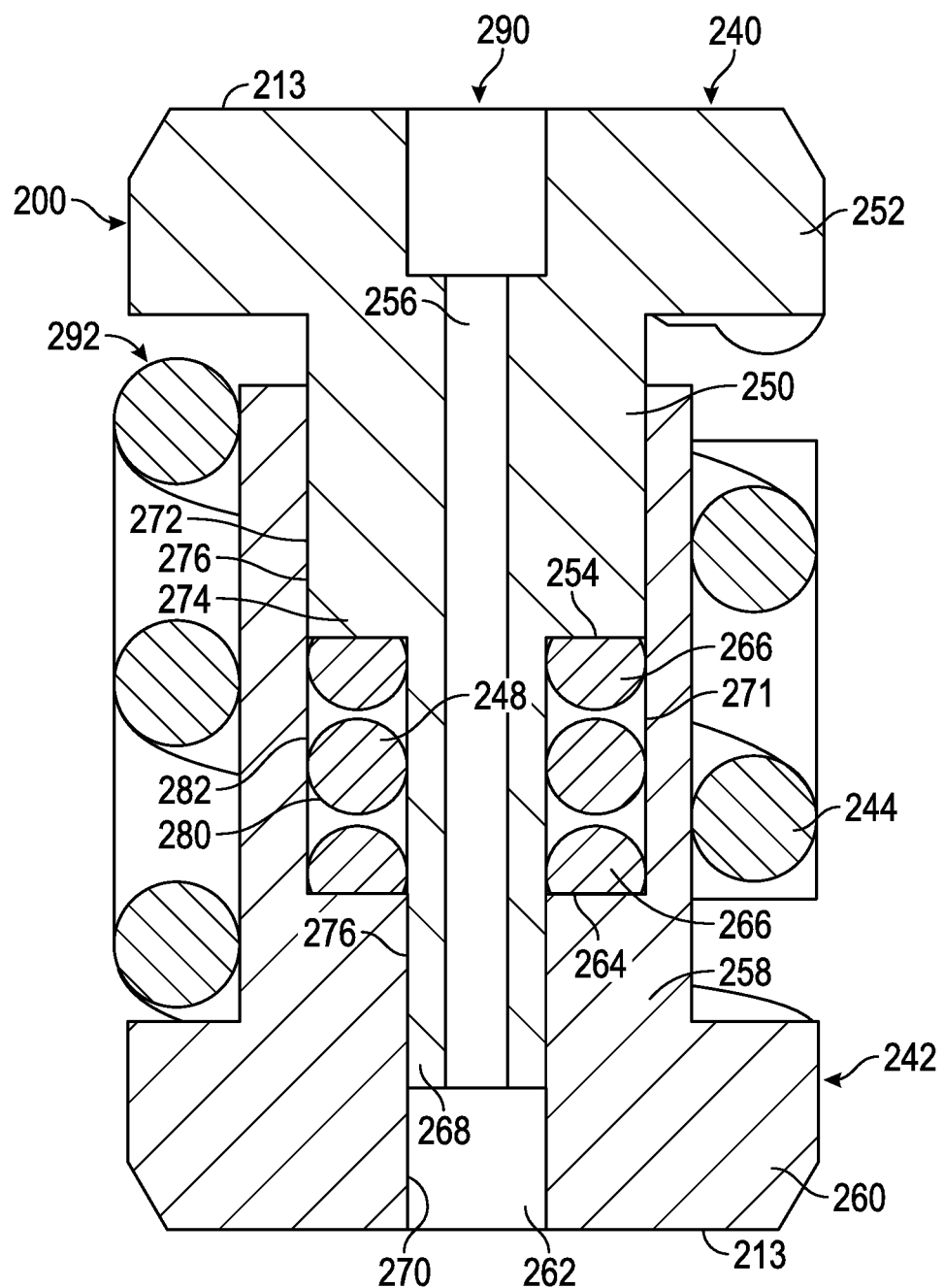
FIG. 3 is an enlarged view of the FIG. 2 seal assembly.

Referring to FIG. 3, there is shown an enlarged view of the valve 200. In one arrangement, the valve 200 may include a pair of pistons 240, 242, a biasing element 244, and a seal 248.

The pistons 240, 242 may be formed as telescoping tubular members and for convenience are referred to as the inner piston 240 and the outer piston 242. In one embodiment, the inner piston 240 has a shaft section 250 and an axial bore 256. The shaft section 250 projects from a diametrically enlarged head 252 and has an intermediate shoulder 254 from that extends a diametrically reduced distal end 268. The axial bore 256 may be omitted in certain embodiments. The outer piston 242 also has a shaft section 258 and an axial bore 262. The shaft section 258 projects from a diametrically enlarged head 260 and has a step 264 that reduces the diameter of the axial bore 262. The heads 252, 260 are shaped and sized to engage the seal elements 212 (FIG. 2). While shown as diametrically enlarged, the heads 252, 260 can be configured differently provided such other configurations include a surface 213 having a size and shape that can form a seal with the sealing elements 212. In one arrangement, the shaft section 250 of the inner piston 240 seats within the bore 262 of the outer piston 242.

The biasing element 244, which may be a spring, surrounds the shaft 258 of the outer piston 242. Illustrative springs include coil springs, leaf springs, disk springs, etc. The biasing element 244 has an axial length sufficient to compressively contact the heads 252, 260. Further, when compressed, the biasing element 244 is configured to generate a spring force sufficient to push the heads 252, 260 away from one another and against their respective seal element 212 to form the pre-seals. It should be understood that the FIG. 2 embodiment is only one non-limiting arrangement for the biasing element 244. Generally speaking, the biasing element 244 need only be arranged such that the contact between the biasing element 244 and the pistons 240, 242 allows the spring force to push the pistons 240, 242 apart. For instance, the biasing element 244 could be positioned at an interior location between the pistons 240, 242.

The seal 248 nests in a cavity 271 defined by the shoulder 254 and the step 264 and forms a lower pressure chamber 280 and an upper pressure chamber 282. The seal 248 may be a pliable annular member formed of material such as elastomers. Optionally, relatively rigid back-up rings 266 may be positioned on opposing sides of the seal 248. In some embodiments, the seal 248 is not positioned in a groove formed in either the upper piston 240 or the lower piston 242. That is, the seal 248 is compressed against flat, as opposed to curved, surfaces. As discussed in greater detail below, the seal 248 may be activated by a pressure differential caused by a relatively higher pressure in either the flow path 204 (FIG. 2) or the flow path 206 (FIG. 2). When activated, the seal 248 expands or extrudes and forms a fluid-tight barrier between the inner piston 240 and the outer piston 242 that blocks flow between the flow paths 204 and 206. The sealing effect of the fluid-tight barrier allows one of the pressure chambers 280, 282 to generate a force that increases the loading applied by the diametrically enlarged heads 252, 260 to their respective seal inserts 212, which further maintains the seal at the locations 208, 210. It should be understood that the FIG. 2 embodiment is only one non-limiting arrangement for the seal 248. In another embodiment, the biasing element 248 may be positioned around the outer piston 242.

In one arrangement, the seal 248 is activated by using two separate flow spaces 290, 292.

The flow space 290 hydraulically connects the flow path 204 to the lower pressure chamber 280. In one embodiment, the flow space 290 may be formed by the bore 256 that extends through the inner piston 240, the bore 262 that extends through the outer piston 242, and an annular space 266 that separates the distal end 268 of the shaft section 250 from an inner surface 270 defining the bore 262 below the step 264. In another embodiment where the inner piston 240 does not include the bore 256, the flow space 290 may be formed by the bore 262 that extends through the outer piston 242 and an annular space 266 that separates the distal end 268 of the shaft section 250 from an inner surface 270 defining the bore 262 below the step 264.

The flow space 292 hydraulically connects the flow path 206 to the upper pressure chamber 282. The flow space 292 may be formed by an annular space 272 that separates a base portion 274 of the shaft section 250 and an inner surface 276 defining the bore 262 above shoulder 254.

Referring to FIGS. 2 and 3, in an illustrative mode of operation, the valve 200 may be actuated to a closed position wherein the piston heads 252, 260 contact the adjacent seal elements 212. A suitable actuator (not shown) may be used to axially displace the shaft 216. Illustrative actuators include, but are not limited to, hydraulic motors, electric motors, piston-cylinder arrangements, etc. Initially, the biasing element 244 may provide the majority of the force to generate a loading to maintain the fluid barriers at locations 208, 210. This loading causes the surfaces of the piston heads 252, 260 and the seal elements 212 to form a fluid-tight seal when the pressures in the paths 204, 206 are not be sufficient to measurably deform the seal 248.

When fluid pressure in the path 204 is larger than the fluid pressure in path 206, this fluid pressure is communicated by the flow space 290 to the lower pressure chamber 280. In response to the applied pressure, the seal 248 extrudes into sealing engagement with the adjacent surfaces of the pistons 240, 242. If present, the back-up rings 266 may support the seal 248 and prevent the seal 248 from being damaged due to excessive deformation. With the seal 248 now activated and forming a fluid-tight seal between the flow paths 204, 206, the pressure in the lower pressure chamber 280 forces the upper and lower pistons 240, 242 apart and against the adjacent seal elements 212. Thus, the seal 248 now enables fluid pressure to provide a majority of the loading at the locations 208, 210 to maintain the fluid barriers.

When fluid pressure in the path 206 is larger than the fluid pressure in path 204, this fluid pressure is communicated through the chamber 202 to the flow space 292 and then to the upper pressure chamber 282. In response to the applied pressure, the seal 248 again extrudes into sealing engagement with the adjacent surfaces of the pistons 240, 242. As before, the back-up rings 266 may support the seal 248 and protect the seal 248 from excessive deformation. Thereafter, the activated seal 248 forms a fluid-tight seal between the flow paths 204, 206 and allows the pressure in the upper pressure chamber 282 to force the upper and lower pistons 240, 242 apart and against the adjacent seal elements 212. Thus, the seal 248 enables fluid pressure to provide a majority of the loading at the locations 208, 210 to maintain the fluid barriers to maintain the fluid barriers.

From the above, it should be appreciated that the present teachings may be applied to a shear seal valve wherein two parts sliding over each other to create the seal. Embodiments of the present disclosure provide an arrangement that insures that the mating pieces are pressed tightly into each other. Certain valves according to the present disclosure use an o-ring between the two central sealing pistons without a traditional o-ring groove in either piston. This arrangement creates a single extrusion gap on either side of the o-ring, with each extrusion gap open to a given pressure chamber that can hold pressure. This allows pressure to come in one extrusion gap and block the other, leaving the high pressure now in the gland to push on both pieces into forming the seal. If it is desired to hold the seal with high pressure in the other direction, the valve still operates the same way. Pressure simply enters the other extrusion gap (where there was low pressure before) and pushes the o-ring to block off the initial extrusion gap (where there was high pressure before). Again, the o-ring gland is filled with high pressure and forces the valve closed despite the fact the high pressure came from a different source. Certain valves according to the present disclosure further use a spring or other suitable biasing element to create the initial preload which is much less susceptible to tolerance stack ups. This, in addition to the design creating an artificial o-ring gland between two pieces with a single extrusion gap on each side, allows normal o-ring squeezes to be applied along with pressure being able to push both pistons into their seat no matter the source of the pressure.

This disclosure uses relative positional terms (e.g., "bottom," "top," "side," "upper," "lower," "horizontal," "vertical," "inner," "outer," etc.) merely for convenience to better describe the features shown in the Figures. It should be understood that the present invention is not limited to any particular orientation.

While the foregoing disclosure is directed to the one mode embodiments of the disclosure, various modifications will be apparent to those skilled in the art. For example, while a hydraulic source is shown for moving the mandrel, an electric motor may also be used to translate the mandrel. Also, in certain embodiments, a unidirectional seal may be used to form an adequate seal. It is intended that all variations be embraced by the foregoing disclosure.

We claim:

1. A valve, comprising:
an enclosure having a chamber, a first flow path in fluid communication with the chamber, and a second flow path in fluid communication with the chamber;
a shaft configured to slide axially in the enclosure, the shaft having a bore;
an outer piston positioned in the shaft bore;
an inner piston telescopically disposed in the outer piston, wherein a cavity separates at least a portion of the inner piston and the outer piston, the cavity is formed between a step of the outer piston and a shoulder of the inner piston,
a seal disposed in the cavity and forming an upper pressure chamber and a lower pressure chamber;
a first flow space connecting the lower pressure chamber with the first flow path;
a second flow space connecting the upper pressure chamber with the second flow path; and
a biasing member engaging the inner and outer piston.

2. The valve of claim 1, wherein:
the outer piston includes:
a head having a sealing surface,
an axial bore extending therethrough,
a shaft section extending from the head,
the step formed along the shaft section, and
a diametrically reduced bore section formed adjacent the step;
the inner piston includes:
a head having a sealing surface,
a shaft section extending from the head,
the shoulder formed along the shaft section,
a diametrically reduced distal end; and,
wherein axially sliding the shaft shifts the sealing surface of the head of the outer piston and the sealing surface of the head of the inner piston between an engaged and disengaged position with the enclosure, and wherein the sealing surface of the head of the outer piston and the sealing surface of the head of the inner piston form fluid barriers with the enclosure when in the engaged position.

3. The valve of claim 2, wherein the biasing member is disposed around the shaft section of the outer piston and applies a biasing force against the heads of the inner piston and the outer piston.

4. The valve of claim 2, wherein the first flow space including at least a portion of the axial bore of the outer piston, and a space between the diametrically reduced distal end and the outer piston.

5. The valve of claim 2, wherein the second flow space includes a space between the shaft section of the inner piston and the outer piston.

6. The valve of claim 1, wherein:
a first pressure in the upper pressure chamber urges the inner piston head against a first seal element and the outer piston head against a second seal element; and
a second pressure in the lower pressure chamber urges the inner piston head against the first seal element and the outer piston against the second seal element.

7. The valve of claim 1, wherein the seal is a single sealing member.

8. The valve of claim 7, wherein the single sealing member extrudes when the upper pressure chamber is pressurized and when the lower pressure chamber is pressurized, the upper and lower pressure members being hydraulically isolated from one another after the single sealing member extrudes.

9. An apparatus connecting a first fluid flow path to a second fluid flow path, comprising:
an enclosure having a chamber, a first flow path in fluid communication with the chamber, and a second flow path in fluid communication with the chamber;
a shaft configured to slide axially in the enclosure, the shaft having a bore;
(a) an outer piston disposed in the shaft bore and including:
a head having a sealing surface,
an axial bore extending therethrough,
a shaft section extending from the head,
a step formed along the shaft section, and
a diametrically reduced bore section formed adjacent the step;
(b) an inner piston including:
a head having a sealing surface,
a shaft section extending from the head,
a shoulder formed along the shaft section, and
a diametrically reduced distal end,
wherein the shaft section of the inner piston is telescopically disposed in the axial bore of the outer piston;
(c) a biasing member engaging the inner and outer pistons, the biasing member pushing the inner and outer pistons apart by applying a biasing force to the inner piston and the outer piston;
(d) a seal member disposed in a cavity formed between the step of the outer piston shaft section and the shoulder of the inner piston shaft section, wherein the seal member forms an upper pressure chamber and a lower pressure chamber in the cavity;
(e) a first flow space hydraulically connecting the lower pressure chamber to the first fluid flow path, the first flow space including at least a portion of the axial bore of the inner piston, and a space between the diametrically reduced distal end and the outer piston;
(f) a second flow space hydraulically connecting the upper pressure chamber to a second fluid flow path, the second flow space including a space between the shaft section of the inner piston and the outer piston, and
(g) a seal element disposed adjacent each head, each seal element being positioned between the associated head and a surface of the enclosure, wherein the biasing member urges each head against the associated seal element,
wherein axially sliding the shaft shifts the sealing surface of the head of the outer piston and the sealing surface of the head of the inner piston between an engaged and disengaged position with the seal elements, and wherein the sealing surface of the head of the outer piston and the sealing surface of the head of the inner piston form fluid barriers with the enclosure when in the engaged position.

10. The apparatus of claim 9, wherein the upper pressure chamber and the lower pressure chamber urge each head against the associated seal element when pressurized.

11. The apparatus of claim 9, wherein the upper pressure chamber and the lower pressure chamber activate the seal member when pressurized, the seal member forming a seal between the inner piston and the outer piston when activated.

12. The apparatus of claim 9, wherein the biasing member is disposed around the shaft section of the outer piston and applies a biasing force against the heads of the inner piston and the outer piston.

13. The apparatus of claim 9, wherein the biasing member is a spring member applying a spring force to the upper piston and the lower piston and the seal member is a single seal member, wherein the single sealing member extrudes when the upper pressure chamber is pressurized and when the lower pressure chamber is pressurized, the upper and lower pressure chambers being hydraulically isolated from one another after the single sealing member extrudes.

14. A method for connecting a first fluid flow path to a second fluid flow path, comprising:
   forming the first and the second fluid flow path in an enclosure;
   disposing a first sealing element and a second sealing element in the enclosure;
   disposing a valve in the enclosure, the valve comprising:
      an enclosure having a chamber, a first flow path in fluid communication with the chamber, and a second flow path in fluid communication with the chamber;
      a shaft configured to slide axially in the enclosure, the shaft having a bore;
      an outer piston positioned in the shaft bore;
      an inner piston telescopically disposed in the outer piston, wherein a cavity separates at least a portion of the inner piston and the outer piston, the cavity is formed between a step of the outer piston and the shoulder of the inner piston;
      a seal disposed in the cavity and forming an upper pressure chamber and a lower pressure chamber;
      a first flow space connecting the lower pressure chamber with the first flow path;
      a second flow space connecting the upper pressure chamber with the second flow path; and
      a biasing member engaging the inner and outer piston,
   sliding the inner piston and the outer piston into engagement with the first sealing element and the second sealing element respectively, a fluid barrier being formed between the first flow path and the second flow path after the engagement;
   urging the inner piston against the first sealing element with the biasing member;
   urging the outer piston against the second sealing element with the biasing member; and
   sliding the inner piston and the outer piston out of engagement with the first sealing element and the second sealing element respectively to allow fluid communication between the first flow path and the second flow path.

15. The method of claim 14, further comprising:
   using a first pressure in the upper pressure chamber to urge the inner piston against the first seal element and the outer piston against the second seal element; and
   using a second pressure in the lower pressure chamber to urge the inner piston against the first seal element and the outer piston against the second seal element.

16. The method of claim 14, further comprising:
   extruding the seal when the upper pressure chamber is pressurized; and
   extruding the seal when the lower pressure chamber is pressurized, wherein the upper and lower pressure chambers are hydraulically isolated from one another after the seal extrudes.

* * * * *